L. HAFEMANN.
AUTOMATIC FEEDING AND WEIGHING ATTACHMENT FOR HAT BODY FORMING MACHINES.
APPLICATION FILED APR. 19, 1912.
1,056,536.
Patented Mar. 18, 1913.
3 SHEETS—SHEET 1.
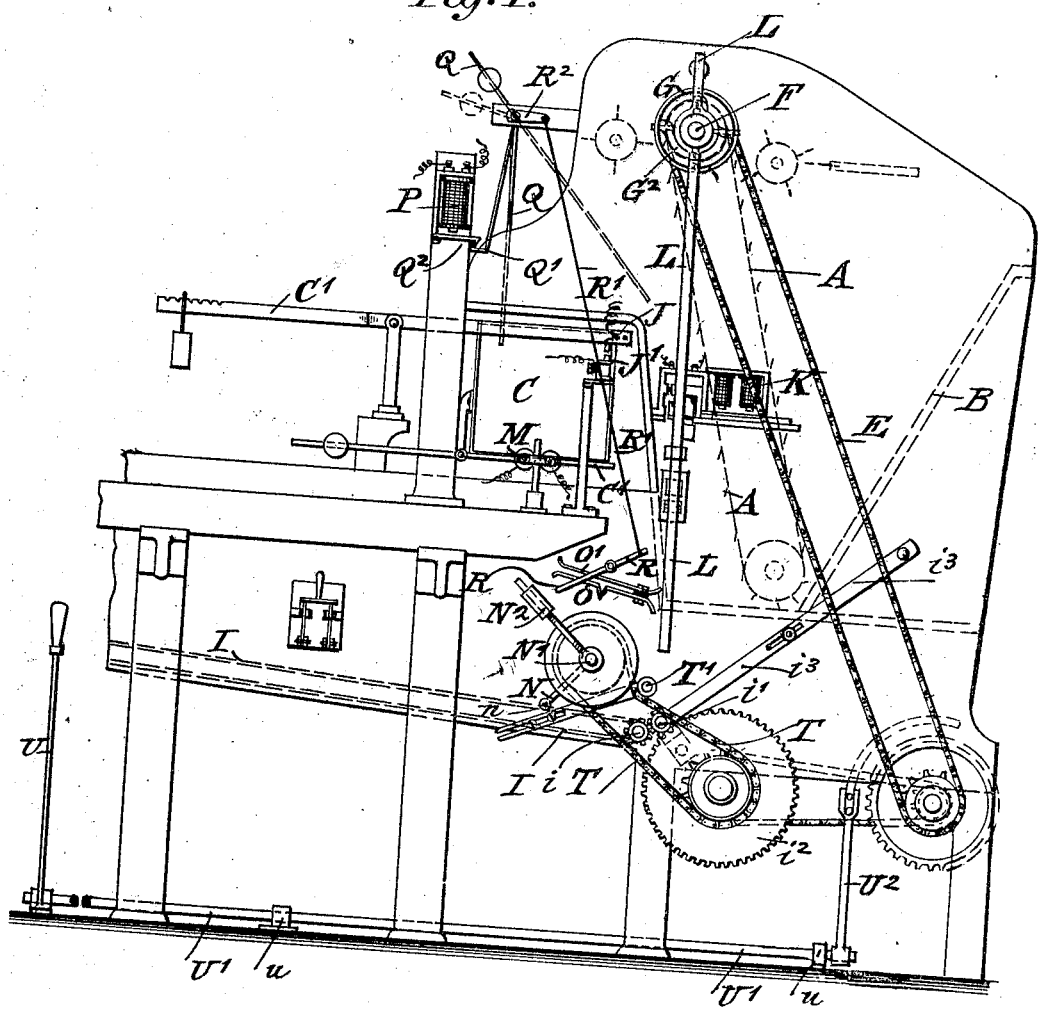

L. HAFEMANN.
AUTOMATIC FEEDING AND WEIGHING ATTACHMENT FOR HAT BODY FORMING MACHINES.
APPLICATION FILED APR. 19, 1912.
1,056,536.
Patented Mar. 18, 1913.
3 SHEETS—SHEET 2.
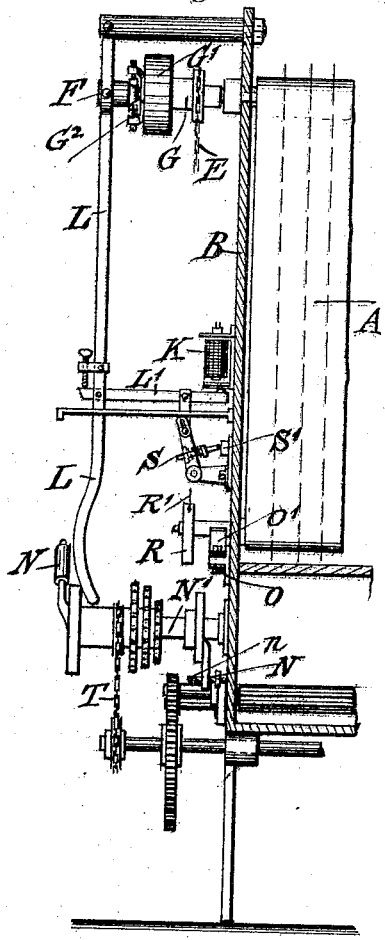
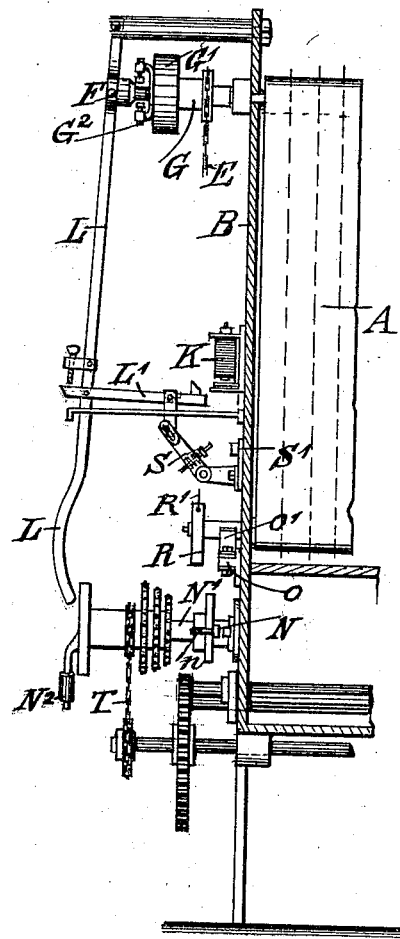
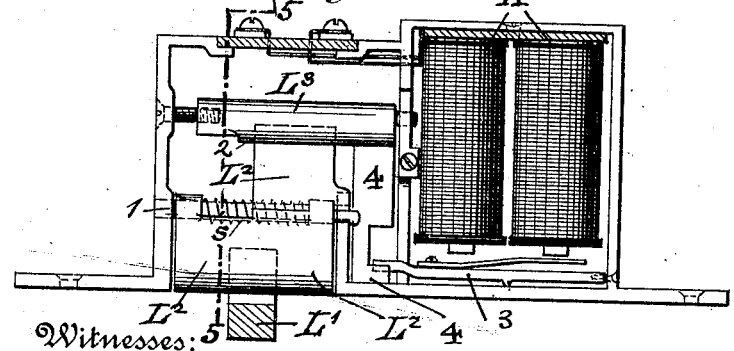
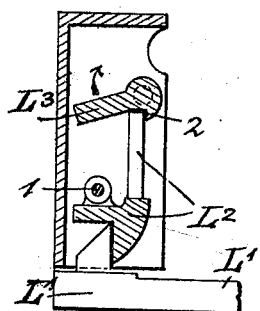

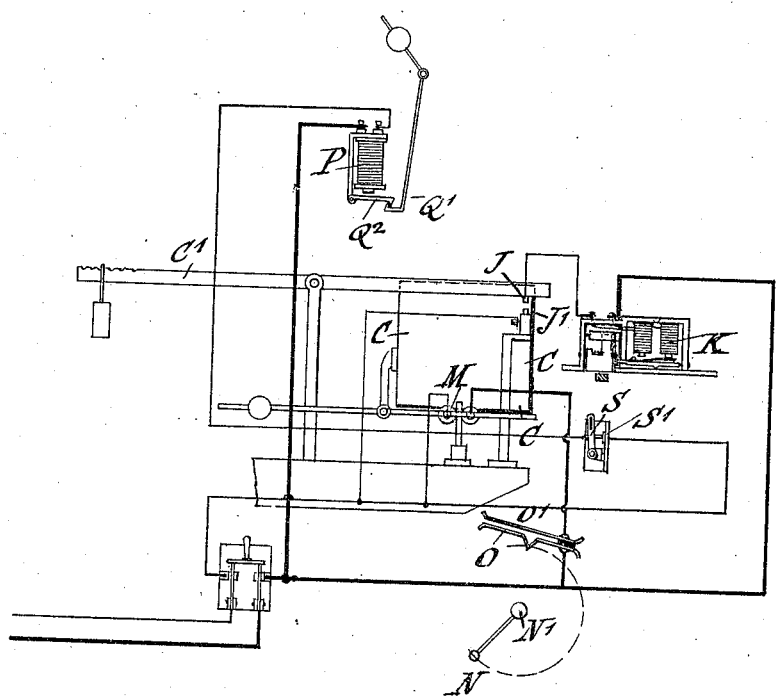

UNITED STATES PATENT OFFICE.

LOUIS HAFEMANN, OF YONKERS, NEW YORK, ASSIGNOR TO FLORENCE PELL WARING, OF NEW YORK, N. Y.

AUTOMATIC FEEDING AND WEIGHING ATTACHMENT FOR HAT-BODY-FORMING MACHINES.

1,056,536.  Specification of Letters Patent.  Patented Mar. 18, 1913.

Application filed April 19, 1912. Serial No. 691,874.

*To all whom it may concern:*

Be it known that I, LOUIS HAFEMANN, a citizen of the United States of America, residing in Yonkers, in the county of Westchester and State of New York, have invented certain new and useful Improvements in Automatic Feeding and Weighing Attachments for Hat-Body-Forming Machines, of which the following is a specification.

This invention relates to certain improvements in feeding and weighing attachments for hat-body forming machines, and more especially to certain improvements in the automatic feeding and weighing mechanism, for which Letters Patent No. 698,234 were granted to Pierre C. Waring on April 22, 1902, whereby a more reliable and accurate working of the apparatus is obtained.

As has been known heretofore, the endless toothed conveyer or apron by means of which the fur is withdrawn from the hopper and transferred to the weighing apparatus, is automatically stopped as a result of the movement of the bottom-part of the pan of the weighing apparatus when it has received its correct predetermined weight of fur and moves down under such weight to a position in which its contents are discharged. To the pan of the weighing apparatus or to some part connected or operating therewith is applied an electric contact which after a certain amount of movement of the pan comes in contact with another contact, closes an electric circuit and thereby energizes an electro-magnet for throwing out of action a clutch on the driving-shaft of the traveling apron so that the movement of the apron is immediately arrested. In the present invention there are combined with such electro-magnet means for stopping the feed-apron and means for mechanically restarting the apron after a certain lapse of time. To effect this there is provided in the machine a constantly-rotating shaft which is provided with a change-speed gear carrying a cam-roller or equivalent device which will come against the clutch or its striking gear and again place the clutch in operation and start the feed-apron. By changing the speed of the constantly-rotating shaft, any desired period of time may elapse after the stopping of the apron before it is restarted. The contents of the pan are discharged and the pan returned to its former position so as to receive a fresh charge of fur between the restarting and stopping of the apron.

To prevent the electric current from passing constantly through the circuit and the contacts between the pan of the weighing after the circuit has been closed and the clutch on the shaft of the feed-apron be thrown out of action and the latter stopped, the clutch-lever is connected with a switch so that as soon as the clutch is moved out of gear, the switch automatically opens the circuit and interrupts the flow of current in the circuit. The clutch is moved into gear again by means of a cam or equivalent device, so that the switch is again closed and the whole apparatus ready to repeat the described operations upon the next depression of the pan of the weighing apparatus.

In the accompanying drawings, Figure 1 represents a side-elevation of my improved automatic feeding and weighing attachment for hat-body forming machines, Fig. 2 is an end-elevation partly in section, taken at right angles to Fig. 1, showing the clutch for driving the feed-apron in side-elevation and in mesh with the shaft of the feed-apron, Fig. 3 is a similar sectional view as Fig. 2, but showing the clutch for driving the feed-apron out of gear with the shaft of the feed-apron, Figs. 4 and 5 are respectively a detail side-view and a vertical transverse section on line 5—5, Fig. 4, drawn on a larger scale, of the electro-magnetic lock, by means of which the clutch is retained in its geared or driving position until it is released in consequence of the dropping movement of the weighing-pan and Fig. 6 is a diagrammatic view of the electric circuits employed in the machine.

Similar letters of reference indicate corresponding parts throughout the several figures of the drawings.

Referring to the drawings, A represents an endless traveling conveyer or feed-apron, B the hopper containing the fibrous material or fur to be fed, and C the pan of the weighing apparatus. All these parts and their accessories are of the usual construction and relative disposition. The teeth of the feed-apron A are arranged to project upwardly for taking up and conveying the fibrous material from the hopper.

According to the present invention, the sprocket-chain E instead of directly driving the shaft F of the feed-apron from the main-shaft of the machine in the usual manner, constantly drives a sleeve G which is loosely rotated upon the shaft F and on which is placed one member G' of the clutch which engages with the movable member or cone G² of the clutch. The movable member G² is arranged to move axially along the shaft F, but prevented from rotating upon it. When the clutch-members G', G² are in the position shown in Fig. 2, the apron-shaft F of the feed-apron is rotated while when the clutch-members are in the position shown in Fig. 3, the shaft is not rotated, and consequently the motion of the feed-apron stopped.

When the feed-apron is in operation and has discharged the proper weight of fur into the pan C of the weighing apparatus, the pan descends until an electric contact J arranged on the upper end of the same comes in contact with the stationary contact J' and closes thereby an electric circuit in which is included an electro-magnetic device K which latter is energized so as to release a latch-member L' which is attached to a clutch-lever L that is pivoted at its upper end to a stationary arm on the side-wall of the hopper B and connected with the movable member G² of the clutch so that the movable clutch-member is instantly released from the clutch-member G and that the different parts assume the position shown in Fig. 3, whereby the motion of the shaft F and of the feed-apron A is arrested and the delivery of fur to the pan interrupted.

The pan C of the weighing apparatus is mounted on a scale-beam C' of the usual construction and provided with a pivoted bottom C² which is controlled by an electro-magnetic latch M. The electro-magnets of this latch are energized so as to release the bottom of the pan and discharge its contents at any suitable time after the motion of the feed-apron has been stopped and before its restarting. In the apparatus shown in the drawings, the latch M is energized by a suitable projection on a crank-arm N which is mounted on a shaft N' and which comes in contact with the lower of two contact-members O, O' which form normally open contacts of an electric circuit that includes the latch M and which, when the lower member O is pressed against the upper member O', close the circuit and release thereby the latch from the bottom of the pan C so that the bottom can descend and discharge the contents of the pan onto a movable feed-apron I which is arranged below the same.

As soon as the fur is discharged from the bottom of the pan, the bottom rises by its counterweight, closes the pan and latches itself in a closed position under the influence of its counter-weight, while the pan has been returned in the meantime into its former position, ready for receiving the next quantity of fur. On the shaft N' is furthermore mounted a cam-roller N² which engages the lower curved end of the clutch-lever L and restores the parts to the position shown in Fig. 2, whereby the clutch is again placed in gear so as to rotate the shaft of the feed-apron and commence a new delivery of fur from the feed-apron to the pan.

For securely cutting off any supply of fur from the feed-apron as soon as the pan moves in downward direction, the same electric circuit which includes the contacts J and J' and the electro-magnetic device K, also includes another electro-magnetic device P which is energized simultaneously with the energizing of the electro-magnet K. In its normal or unenergized position, the electro-magnet P holds a deflector Q in its normal vertical position by means of an arm Q' which is engaged by a latch Q² on the armature of the electro-magnet P, as shown in Fig. 1. As soon as the electro-magnet P is energized, the catch of the deflector Q is released by the latch Q² on the armature so that the deflector under the influence of a counter-weight at its upper end is moved into inclined position, shown in dotted lines in Fig. 1, in which position it intercepts the last delivery of fur from the top of the feed-apron, prevents it from falling into the pan and returns it back into the hopper. Just before the motion of the feed-apron is restarted by the mechanical actuation of its clutch-lever, the deflector Q is returned into its vertical position by a pin or projection n on the arm N coming in contact with the lower end of a fulcrumed lever R, the upper end of which is connected by a pivot-rod R' with an arm R² on the deflector pivot so as to move the deflector back into its vertical position and into latching engagement with the armature of the electro-magnet P.

In Figs. 4 and 5 is illustrated the electro-magnetic locking device K by means of which the clutch G', G² is moved into or out of gear. The latch-member L' which is attached to the clutch-lever is shown as locked to the armature of the electro-magnet K when holding the clutch in gear. The latch L' engages with the member L² which is capable of angular motion around the shaft 1 under the tension of the helical spring s of the clutch shown in Fig. 1, but which, when the parts are in the position shown in Figs. 4 and 5, is prevented from moving as it is locked in place by its upper end coming in contact with the tail-piece 2 of a second angularly-movable member L³. When the parts are in the position shown in the drawings, the member L³ is prevented from turning by the end of the armature 3 abutting against the downwardly-depending limb 4 of the member L³, as shown in Fig. 3. As soon, however, as the electromagnet K is energized, the armature is raised and thereby moved out of the way of the limb 4 of the member L³ so that it no longer prevents the rotation in the direction of the arrow shown in Fig. 5 of the member L³. This being the case, the tailpiece 2 no longer prevents the movement of the member L² so that the same gives way and releases the latch L'. The different parts of the lock are then returned under the action of gravity and of the helical spring s on the shaft 1 to the position illustrated in Figs. 4 and 5, so as to be ready for engagement by the latch L' when the clutch is again placed into gear.

In order that the contacts J and J' and the circuit closed by the same are not unnecessarily traversed by the current, the circuit containing these parts is provided with a switch S, S', which is opened, as shown in Fig. 3, when the clutch-lever moves into its inoperative or open position so that the circuit is interrupted. When the clutch-lever moves the clutch into its geared or operative position, the switch S, S' is returned into closed position, as shown in Fig. 2.

The cam-shaft N' is driven by suitable sprocket-wheels and a sprocket-chain T which is kept taut by an adjustable idler T', the sprocket-wheels being again driven by a suitable pinion on the shaft of the conveying belt or apron and a gear-wheel transmission i', i², as shown in Fig. 1.

In order that the apparatus may be started or stopped from that end of the machine, at which the hat-body forming cone is located, it is preferable to arrange a starting and stopping lever U at that end. This lever U is shown in Fig. 1 and is connected by an axially-turning rod U' which turns in keepers u, with a belt-shifting lever U² by which the driving-shaft of the sprocket-wheel transmission for the feed-apron is placed in or out of operation, and the entire feeding attachment stopped.

The arm N may be angularly adjusted upon its shaft so as to vary the timing of the operations which are controlled thereby. It is, of course, understood that the feed-apron is of such delivering capacity as to give the required charge to the pan in the proper time before the above-described operations can be effected. The fur when delivered from the pan is dropped onto the endless conveying belt or apron I and conducted by the same and by suitable intermediate mechanism to the hat-body forming cone in the usual manner. The conveying-belt or apron is driven by means of a shaft to which rotary motion is applied, which motion is transmitted by the pinion and gear-wheel transmission before referred to, to the shaft N', while the motion of the shaft N' can be interrupted by means of a sliding lever i³ which is arranged along the side-wall of the hopper B and by which the intermediate motion-transmitting pinion is moved out of mesh with the pinion on the shaft of the conveying belt or apron so that the latter is stopped whenever it should be necessary to prevent the feeding of fur to the hat-body forming cone. The other accessories of the weighing and feeding attachment are the same as in the machines of this type heretofore in use.

I claim:

1. In a feeding and weighing attachment for hat-body forming machines, the combination of a feed-apron, a movable weighing-pan, electric contacts controlled by said pan, an electric circuit, an electro magnetic locking device in said circuit, a clutch on the shaft of the feed-apron which clutch is placed out of gear by said electro-magnetic locking device, and a rotatory cam-roller for placing the clutch into gear, so that when the required quantity of fur has been delivered to the pan the motion of the feed-apron is electrically interrupted and when the fur has been discharged from the pan, the feed-apron is mechanically restarted.

2. In a feeding and weighing attachment for hat-body forming machines, the combination of a feed-apron, a movable weighing-pan, electric contacts controlled by said pan, an electric circuit, an electro-magnetic locking device in said circuit, a clutch on the shaft of the feed-apron which clutch is placed out of gear by the electro-magnetic locking device, a cam for placing the clutch into gear, means for rotating said cam, and a switch in said circuit operated by the clutch-operating gear for interrupting the electric circuit on placing the clutch out of gear and arresting the motion of the feed-apron.

3. In an automatic feeding and weighing attachment for hat-body forming machines, the combination of a fur-feeding apron, a movable weighing pan, electric contacts controlled by said pan, an electric circuit, an electro-magnetic locking device included in said circuit, a clutch which is placed out of gear by said electro-magnetic locking device, a pivoted bottom for the pan, an electro-magnetic latch for releasing said bottom, a switch for releasing said latch, and means for mechanically moving the clutch into gear for restarting the feeding operation after a certain predetermined period of time.

4. In an automatic weighing and feeding attachment for hat-body forming machines, the combination, of a fur-feeding apron, a movable weighing pan, electric contacts controlled by said pan, an electric circuit, an electro-magnetic locking device in said circuit, a clutch which is placed out of gear by said electro-magnetic locking device, a pivoted bottom for said pan, an electro-magnetic latch in said circuit for releasing the bottom, a switch for releasing said latch, a deflector, an electro-magnetic releasing device for said deflector, means for mechanically returning the deflector into locked position, and means for mechanically moving the clutch into gear for restarting the feeding operation after a certain predetermined period of time.

In testimony, that I claim the foregoing as my invention. I have signed my name in presence of two subscribing witnesses.

LOUIS HAFEMANN.

Witnesses:
 PAUL GOEPEL,
 JOHN MURTAGH.